(12) United States Patent
Matias et al.

(10) Patent No.: US 12,717,954 B2
(45) Date of Patent: Aug. 25, 2026

(54) SYSTEMS AND METHODS FOR AUTHENTICATING USERS TO ACCESS DATA

(71) Applicant: Stripe, LLC, South San Francisco, CA (US)

(72) Inventors: Jose Carlos Matias, South San Francisco, CA (US); Bryan Irace, Rye, NY (US); Jiwon Kim, South San Francisco, CA (US); Jie Ren, Seattle, WA (US); Ashwin Curran Raja, Ithaca, NY (US); Erin Lynne Kavanaugh, Newport Beach, CA (US)

(73) Assignee: Stripe, LLC, South San Francisco, CA (US)

( * ) Notice: Subject to any disclaimer, the term of this patent is extended or adjusted under 35 U.S.C. 154(b) by 16 days.

(21) Appl. No.: 18/968,901

(22) Filed: Dec. 4, 2024

(65) Prior Publication Data

US 2026/0154433 A1 Jun. 4, 2026

(51) Int. Cl.

| | |
|---|---|
| ***H04L 29/06*** | (2006.01) |
| ***G06F 21/31*** | (2013.01) |
| ***G06F 21/62*** | (2013.01) |
| ***H04L 9/32*** | (2006.01) |

(52) U.S. Cl.
CPC .......... *G06F 21/6218* (2013.01); *G06F 21/31* (2013.01); *H04L 9/3213* (2013.01); *G06F 2221/2141* (2013.01)

(58) Field of Classification Search
CPC ..... G06F 21/6218; G06F 21/31; H04L 9/3213
See application file for complete search history.

(56) References Cited

U.S. PATENT DOCUMENTS

| | | | | |
|---|---|---|---|---|
| 2021/0385224 | A1* | 12/2021 | Singh | H04L 63/0853 |
| 2024/0241927 | A1* | 7/2024 | Richman | G06F 21/6218 |
| 2026/0010593 | A1* | 1/2026 | Kumar | G06F 21/31 |

OTHER PUBLICATIONS

Okta, "Configure Identifier First Authentication," retrieved from https://auth0.com/docs/authenticate/login/auth0-universal-login/identifier-first on May 15, 2024, 12 pages.

* cited by examiner

*Primary Examiner* — Wasika Nipa
(74) *Attorney, Agent, or Firm* — Foley & Lardner LLP

(57) ABSTRACT

Methods and systems for disambiguating a user from a plurality of users within a computing infrastructure when the plurality of users utilize a common identifier are described. Disambiguation may occur through the user of subsequent verification of the identity of the user which generates an authentication token to be passed to the computing infrastructure during authentication requests using the common identifier.

20 Claims, 6 Drawing Sheets

SYSTEMS AND METHODS FOR AUTHENTICATING USERS TO ACCESS DATA

TECHNICAL FIELD

This application relates generally to methods and systems to authenticate users to access unique data based on common authentication credentials.

BACKGROUND

Traditional systems for authenticating a user to access data within a computing environment face significant technical challenges when authenticating an individual across multiple accounts and/or computing environments when multiple users are associated with the same authentication credentials (e.g., a similar account identifier such as a username, email, or phone number). Using a common identifier for authentication traditionally results in an ambiguity as to which user is seeking to be authenticated, resulting in repeatedly executing secondary verifications and/or security risks of inappropriately providing data access to a user who does not have permissions to access the data.

SUMMARY

Therefore, what is needed is a method and system for universally disambiguating and authenticating a user across multiple accounts and/or computing environments when the user utilizes an identifier common to a plurality of users. In at least one embodiment of the methods and systems described herein, the user is universally authenticated using an identifier unique to the user, which can then be used to disambiguate the user when using the common identifier to access data in subsequent browsing sessions.

The methods and systems discussed herein provide several technical advantages, primarily in simplifying the authentication of multiple data objects. By allowing multiple users to share a common identifier, the methods and systems discussed herein reduce the complexity associated with managing numerous usernames and passwords. The methods and systems discussed herein also improve account security by enhancing the use of verification and authentication tokens. These tokens ensure that each user can only access the data they are authorized to view, providing a robust security measure beyond traditional username and password combinations. This extra layer of security helps protect sensitive information and prevent unauthorized access.

Furthermore, the methods and systems discussed herein provide seamless cross-platform authentication. Users can authenticate across multiple accounts and computing environments using a single authentication token. This capability eliminates the need for multiple logins, allowing users to switch effortlessly between different systems. The product-agnostic and data-agnostic nature of the authentication protocols discussed herein allow for a user to access multiple data objects using a common identifier, thereby eliminating the need to generate multiple accounts for different users. Therefore, the methods and systems discussed herein lower the computing resources, provide more efficiency, and reduce the needed to generate multiple accounts for multiple users.

The systems and methods described herein simplify and secure user access across multiple computing environments and data sources. Multiple users can share a common identifier to log into a common computing platform while ensuring each user only accesses data they are authorized to view. Prior to providing access to protected data within the computing environment, a user is authenticated through the use of a verification token, and an authentication token is subsequently transmitted to the user's device. When the user logs into the common platform during a subsequent session using the common identifier, the common platform recognizes the authentication token and grants personalized access to the user, despite the user using a common identifier and or common credential (e.g., a password) shared among multiple users. Additionally, this system allows the processor to authenticate the user across multiple accounts using a single authentication token, enabling access to other computing environments since the authentication token may be both product-agnostic and data-agnostic. This system allows authentication of a user associated with a first identifier in a first computing environment based on a previous authentication of the user using a second identifier in a second computing environment.

The authentication method and system described herein provides at least in some embodiments, improved authentication techniques when a business has multiple consumers/users in different networks. For example, a user can use the same credentials to be authenticated both in a first account in a first computing platform and a second account in a second computing platform. Using the systems and methods described herein, multiple users may share an authenticating identifier while preserving each authorized user's individual access permissions/rights.

In some embodiments, the authentication methods and systems herein allow for users to be authenticated in an identifier-first platform. For example, an individual user may be authenticated based on verification of access to a unique identifier, such as a personal telephone number. This verification/authentication may be done on a standalone authentication system distinct from 3$^{rd}$ party networks to which the user may request access. Once a user is authenticated by the standalone authentication system, a cookie (or other authentication token) associated with the user device may be generated and stored locally on device or on the standalone authentication system. This token may then be used to authenticate a user who attempts to log into the 3$^{rd}$ party network using only the unique identifier (e.g., without a corresponding password or other encrypted credential). The 3$^{rd}$ party network may request, through an API, an authentication of the user/user device attempting to login. Upon receiving the authentication request, the cookie is passed to the 3$^{rd}$ party network and the user attempting to log into the network is authenticated, as long as the 3$^{rd}$ party network allows authentication by the personal telephone number.

In some aspects, the techniques described herein relate to an authentication method including: receiving, by one or more processors from a user device operated by a first user of a plurality of users during a first session, a common authentication credential associated with a data object accessible by the plurality of users, the data object associated with a first computing environment; responsive to authenticating the first user using a second authentication credential unique to the first user and a corresponding encrypted credential unique to the second authentication credential, generating, by the one or more processors, an authentication data structure associated with the common authentication credential and linked to the first user, wherein the authentication data structure represents the first user of the plurality of users; transmitting, by the one or more processors, the authentication data structure to the user device; receiving, by the one or more processors from the user device during a second session subsequent to the first session, a request to access protected data associated with the data object using the common authentication credential associated with the data object accessible to the plurality of users; authenticating, by the one or more processors, the user device using the common authentication credential of the plurality of users; in response to detecting the authentication data structure on the user device, determining, by the one or more processors, that the request is associated with the first user and a subset of protected data authorized to be accessed by the first user via the authentication data structure; granting, by the one or more processors, to the user device, access to the subset of protected data; identifying, by the one or more processors, a second data object associated with a second computing environment linked to the common authentication credential; and in response to determining the presence of the authentication data structure on the user device, instructing, by the one or more processors, a secondary processor of the second computing environment to grant access to data associated with the second data object.

In some aspects, the techniques described herein relate to an authentication method, further including: receiving, by the one or more processors from the user device, a selection of the authentication data structure prior to receiving the request, such that the user device is configured to access at least the second data object using a second authentication data structure.

In some aspects, the techniques described herein relate to an authentication method, further including: instructing, by the one or more processors, an application programming interface to transmit the authentication data structure to the one or more processors of a computing environment when the first user requests access to one or more data objects associated with the computing environment.

In some aspects, the techniques described herein relate to an authentication method, further including: receiving, by the one or more processors from a server hosted on the first computing environment through an application programming interface, a request for an authentication of the user device; and transmitting, by the one or more processors to the server, the authentication data structure.

In some aspects, the techniques described herein relate to an authentication method, further including: determining, by the one or more processors, a verification requirement for accessing the data object, wherein the verification requirement includes verifying the common authentication credential and the second authentication credential; transmitting, by the one or more processors to the common authentication credential accessed on the user device, a verification token; and verifying, by the one or more processors, the common authentication credential in response to receiving the verification token from the user device.

In some aspects, the techniques described herein relate to an authentication method, further including disambiguating, by the one or more processors, the request by identifying, by the one or more processors, a presence of the authentication data structure on the user device.

In some aspects, the techniques described herein relate to a system including: one or more processors; and a computer-readable non-transitory medium including instructions that, when executed by the one or more processors, cause the one or more processors to: receive from a user device operated by a first user of a plurality of users during a first session, a common authentication credential associated with a data object accessible to the plurality of users; responsive to authenticating the first user using a second authentication credential unique to the first user, generate an authentication token associated with the common authentication credential and linked to the first user, wherein the authentication token represents a particular user of the plurality of users; transmit the authentication token to the user device; receive from the user device during a second session subsequent to the first session, a request to access protected data associated with the data object using the common authentication credential associated with the data object accessible to the plurality of users; authenticate the user device using the common authentication credential of the plurality of users; determine a subset of the protected data authorized to be accessed by the first user via the authentication token; and grant to the user device, access to the subset of the protected data.

In some aspects, the techniques described herein relate to a system, wherein authenticating the first user is performed without receiving the common authentication credential.

In some aspects, the techniques described herein relate to a system, wherein authenticating the first user includes: transmitting an authentication prompt to the user device linked to the common authentication credential and the second authentication credential.

In some aspects, the techniques described herein relate to a system, wherein the authentication token is stored as a data structure on a browser of the user device.

In some aspects, the techniques described herein relate to a system, the instructions further causing the one or more processors to: receive from a server hosted on a first computing environment through an application programming interface, a request for an authentication of the user device; and transmit to the server, the authentication token.

In some aspects, the techniques described herein relate to a system, the instructions further causing the one or more processors to: determine a verification requirement for accessing the data object, wherein the verification requirement includes verifying the common authentication credential and the second authentication credential; transmit to an account identified by the common authentication credential and accessed on the user device, a verification token; and verify the common authentication credential in response to receiving the verification token from the user device.

In some aspects, the techniques described herein relate to a system, the instructions further causing the one or more processors to disambiguate the request by identifying a presence of the authentication token on the user device.

In some aspects, the techniques described herein relate to an authentication method including: receiving, by one or more processors from a user device operated by a first user of a plurality of users during a first session, a common authentication credential associated with a data object accessible to the plurality of users; responsive to authenticating the first user using a second authentication credential unique to the first user, generating, by the one or more processors, an authentication token associated with the common authentication credential and linked to the first user, wherein the authentication token represents a particular user of the plurality of users; transmitting, by the one or more processors, the authentication token to the user device; receiving, by the one or more processors from the user device during a second session subsequent to the first session, a request to access protected data associated with the data object using the common authentication credential associated with the data object accessible to the plurality of users; authenticating, by the one or more processors, the user device using the common authentication credential of the plurality of users; determining, by the one or more processors, a subset of the protected data authorized to be accessed by the first user via the authentication token; and granting, by the one or more processors, to the user device, access to the subset of the protected data.

In some aspects, the techniques described herein relate to an authentication method, wherein authenticating the first user is performed without receiving the common authentication credential.

In some aspects, the techniques described herein relate to an authentication method, wherein authenticating the first user includes: transmitting, by the one or more processors, an authentication prompt to the user device linked to the common authentication credential and the second authentication credential.

In some aspects, the techniques described herein relate to an authentication method, wherein the authentication token is stored as a data structure on a standalone authentication server, wherein the standalone authentication server is product agnostic.

In some aspects, the techniques described herein relate to an authentication method, further including: receiving, by the one or more processors from a server hosted on a first computing environment through an application programming interface, a request for an authentication of the user device; and transmitting, by the one or more processors to the server, the authentication token.

In some aspects, the techniques described herein relate to an authentication method, further including: determining, by the one or more processors, a verification requirement for accessing the data object, wherein the verification requirement includes verifying the common authentication credential and the second authentication credential; transmitting, by the one or more processors to the common authentication credential accessed on the user device, a verification token; and verifying, by the one or more processors, the common authentication credential in response to receiving the verification token from the user device.

In some aspects, the techniques described herein relate to an authentication method, further including disambiguating, by the one or more processors, the request by identifying, by the one or more processors, a presence of the authentication token on the user device.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
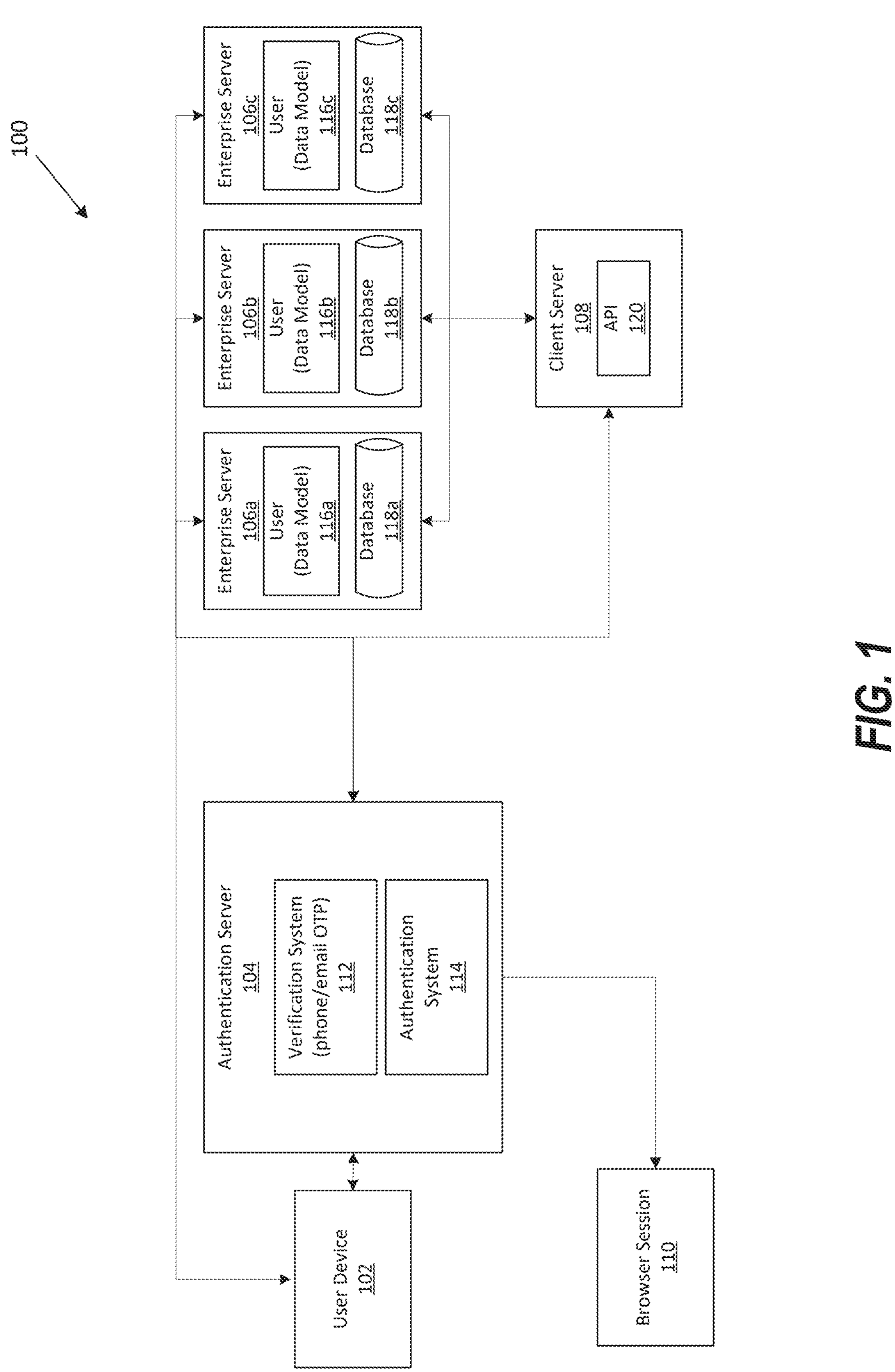
FIG. 1 illustrates a block diagram of a computing system for authenticating users to access data across multiple computing environments using a single authentication token, according to one or more embodiments.

Reference will now be made to the illustrative embodiments illustrated in the drawings, and specific language will be used here to describe the same. Nevertheless, it will be understood that no limitation of the scope of the claims or this disclosure is intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The methods and systems described herein may provide a streamlined authentication process for an individual based on an identifier-centric paradigm (referred to herein as the authentication system and/or the authentication method). The authentication system may allow for multiple technical improvements to traditional authentication processes which rely on validating a username with a corresponding password which is stored in a database within a computing environment. In at least one embodiment the methods and systems described herein, the authentication system may allow for authenticating a user independent of any stored username and password within a database, allowing for multiple users to have different accounts while sharing one or more identifiers.

Additionally or alternatively, the authentication system, as described herein, may allow for authentication of a user that has multiple identifier types associated with the user. Multiple identifiers may include, but are not limited to, an email address, a phone number, an instant messaging account name, a social media handle, or other identifier to which communications may be transmitted to and received. Other improvements provided by the authentication method may include authenticating multiple identifiers of the same type per user. For example, a single user may have multiple identifiers of the same type, such as multiple phone numbers or email addresses.

Additionally or alternatively, the authentication system may allow for the authentication of multiple users associated with the same identifier, such as multiple employees sharing a phone number and/or email address.

Turning now to FIG. 1, a system 100 is illustrated. In at least one embodiment, FIG. 1 illustrates a situation in which a user is authenticated to access data, such as an individualized version of a user account, on a network when using common, non-individualized credentials that are shared with multiple users to access the user account.

The system 100 may include one or more of a user device 102, an authentication server 104, enterprise servers 106*a*, 106*b*, and 106*c*, a client server 108, and/or a browser session 110. Although only a single user device 102 is shown in FIG. 1, it is understood that any number of user devices 102 may be included in the system 100 without diverging from the description herein. Likewise, for ease of description, only a single authentication server 104, enterprise server **106*a*, 106*b*, and 106*c*, client server 108, and browser session 110 is shown and described, however, it is understood that more or less of these components may be included in the system 100**.

The user device 102 may be communicably coupled to the authentication server 104 through a network (not shown). The network may include any number of internal networks, external networks, private networks (e.g., intranets, VPNs), and public networks (e.g., Internet). The networks comprise various hardware and software components for hosting and conduct communications amongst the components of the system 100. Non-limiting examples of such internal or external networks may include a Local Area Network (LAN), Wireless Local Area Network (WLAN), Metropolitan Area Network (MAN), Wide Area Network (WAN), and the Internet. The communication over the networks may be performed in accordance with various communication protocols, such as Transmission Control Protocol and Internet Protocol (TCP/IP), User Datagram Protocol (UDP), and IEEE communication protocols, among others.

The user device 102 may be any type of electronic device comprising hardware components (e.g., processor, non-transitory storage) and software components capable of performing the various processes and tasks described herein. Non-limiting examples of the user device 102 include personal computers (e.g., laptop computers, desktop computers), server computers, mobile devices (e.g., smartphones, tablets), VR devices, and gaming consoles, among other types of electronic devices. The user device 102 may be configured to receive input from a human-machine interface ("HMI") such as a keyboard, mouse, trackball, microphone, touchscreen, console, etc. In certain embodiments, the user device 102 is a mobile device associated with a user and receives one or more indications of a user identifier (also referred to herein as "identifier" and "authentication credential") to transmit to the authentication server 104.

The identifier may be any string of digits or text associated with a user/user account and utilized in communication systems during the transmission of communications to identify a user. The identifier includes, but is not limited to, a user account handle/name, an email address, a phone number, an instant messaging account name, a social media handle, or other identifier to which communications may be transmitted and received. The user device 102 may be used to present for display, during a browser session 110, data accessed from the authentication server 104, the enterprise servers **106*a*-106*c*, and/or the client server 108. For example, enterprise server 106*a* may be a server hosting an enterprise platform, such as an employee database. Enterprise server 106*a* may include a user 116*a*. The user 116*a* may be a data model representing a user (e.g., an employee). In some embodiments, the user 116*a* is associated with the user device 102, and the user device 102 is provided access to data within a database 118*a* hosted on the enterprise server 106*a*. The database 118*a* may host, for example, unprotected data available to any user device accessing enterprise server 106*a***, protected enterprise data available to employees of the enterprise, and/or protected user data available to specific users associated with the protected data (e.g., the user, administrative users, etc.).

The unprotected data available to any user accessing the enterprise server **106*a*** may include, for example, basic information about the company (e.g., name, history, mission, values), details about the products or services offered (e.g., descriptions, specifications, pricing), and contact information (e.g., addresses, phone numbers, email addresses, social media links). The unprotected data may also showcase leadership and team members (e.g., names, photos, biographies), publish news and updates (e.g., press releases, blog posts, event announcements), and provide information about career opportunities (e.g., job listings, application instructions). Certain reports may be accessible (e.g., annual reports and investor relations data). Additionally or alternatively, customer testimonials and references (e.g., testimonials, case studies) may be included in the unprotected data. Policy documents (e.g., privacy policies, terms of service), along with a section for frequently asked questions ("FAQs") may also be included in the unprotected data.

The protected enterprise data on the authentication server may correspond to shared data among a plurality of employee users. The one or more shared data elements may include enterprise information generic to the enterprise. For example, these may include, organizational policies and procedures, such as the employee handbook, code of conduct, and safety guidelines; strategic documents like the company's mission statement, vision, and core values; operational details, such as organizational charts, department roles, and contact information; enterprise updates, including company news, event announcements, and progress reports on key projects; shared performance metrics and goals, such as quarterly business reports and annual objectives; training materials, professional development resources, and information about available benefits and services; and/or collaborative tools and resources, such as templates, best practices, and knowledge bases, facilitate efficient and standardized work processes across the organization.

The protected user data available to specific users associated with the protected data may include, for example, basic identification information such as full name, date of birth, and contact details, including phone numbers and email addresses. Additionally, it may contain employment-related information like job title, department, and manager's name. The protected user data may include work history, educational background, and certifications. Additionally or alternatively, the protected user data may include sensitive information such as Social Security numbers or other national identification numbers, bank account details for payroll, and emergency contact information. Work-related information may be included in the protected user data as well, such as performance reviews, attendance records, and disciplinary actions might be recorded. Other personal data could include login credentials, access permissions, and potentially biometric data for security purposes. Health information, particularly if related to occupational health and safety, might also be part of the protected user data.

Enterprise server **106*a* and its associated user 116*a* and database 118*a* are described herein, however, it is understood that the embodiments and descriptions related to the enterprise server 106*a* and its associated components may extend in part, or whole, to the enterprise server 106*b* (including its associated user 116*b* and database 118*b*) and/or the enterprise server 106*c* (including its associated user 116*c* and database 118*c***).

The enterprise server **106*a* may be communicably coupled to the enterprise server 106*b*, the enterprise server 106*c*, and/or user device 102. Though communicably coupled, the enterprise servers 106*a*-106*c* may be separably hosted. Additionally or alternatively, the enterprise servers 106*a*-106*c* may be communicably coupled to the client server 108 through the use of one or more pluggable components, such as an Application Programming Interface ("API"), shown as API 120 in FIG. 1**.

The API 120 may be a set of rules and/or protocols that allow one software applications (e.g., the authentication server 104) to interact with another (e.g., the enterprise server 106*a*). It may include instructions to define how the enterprise server 106*a* may interact with the authentication server 104 and/or the user device 102, including the types of requests that can be made, how to make those requests, the data formats to use, and the conventions for error handling. In at least one exemplary embodiment, the API 120 may be used to retrieve an authentication token (also referred to herein as "authentication data structures") generated by the authentication system 114 of the authentication server 104 and present them to the enterprise server 106*a* to identify/authenticate the user device 102 to the enterprise server 106*a*. The API 120 may specify endpoints, or specific paths or URLs through which the API can be accessed, each corresponding to a specific functionality or data resource, such as the authentication token or authentication data structure stored on the user device 102 or the authentication server 104.

The authentication token may be, in some embodiments, a token such as a digital certificate, an OAuth token, a JWT token, a session token, an API key, a SAML token, an ID token, a persistent cookie, a refresh token, an SSO token, etc.

The authentication token (or authentication data structure) may be associated with the user device such that passing the authentication token to the enterprise server 106*a* (e.g., by means of the API 120 of the client server 108) provides authentication that the user device 102 from which the authentication token came (or was otherwise associated with) is associated with the user, thus authenticating the user and thereby providing access to protected data accessible by the user based on permission details. In some instances, authentication of the user device 102 permits access to a data object (e.g., a user account) stored in the database 118*a*.

The API 120 may also define methods or actions that can be performed, such as GET (to retrieve data), POST (to send data to create a new resource), PUT (to update an existing resource), and DELETE (to remove a resource). When the enterprise server 106*a* interacts with the client server 108 (and by extension, the authentication server 104) through the API 120, it sends a request, such as a request for an authentication of a user device or user. At times, the client server 108 returns to the enterprise server 106*a* data in a specified format, such as JSON or XML. This data may include the authentication token or data structure that satisfies the authentication request from the enterprise server 106*a*.

In at least one embodiment, the API 120 permits authentication and/or authorization of the user device 102 to the enterprise server 106*a* based on a previous authentication and/or authorization of the user device 102 by the authentication server 104, ensuring that the user device 102 is verified and has permission to perform the requested actions (such as accessing protected enterprise data and/or protected user data). To accomplish this, the API 120 may use one or more of API keys, OAuth tokens, and JWT (JSON Web Tokens).

Additionally or alternatively, the system 100 may provide a method and system for disambiguating between users sharing a common credential and authenticating a user device to access protected data (e.g., protected enterprise data, protected user data, etc.) when the user device requests access to the protected data based on a common authentication credential shared among a plurality of users of the enterprise server 106*a*. The common authentication credential may be a common identifier shared between a plurality of users, such as a business telephone number shared by employees in a business department. However, the common authentication credential may be any identifier as described herein, such as an email address, social media handle, etc. The ability to disambiguate between users with a common credential may be beneficial in certain instances. By way of example, processing power is reduced in the system 100 because fewer credentials need to be saved in the environment. For example, an enterprise network may only need to have saved in memory a single credential for a plurality of employees, yet still be able to determine which employee is attempting to sign into the network enterprise. By correctly determining which employee is attempting to sign in, the system 100 may present relevant/appropriate data (e.g., data to which the employee has access) to the employee.

For example, in at least one non-limiting embodiment, the user device 102 receives an enterprise telephone number from a first user as an identifier of the user. The enterprise telephone number is a shared identifier of multiple users within the same department as the user, such as a customer service number that the multiple users manage. In other words, multiple users may have access to this phone number and thereby show ownership. The user device transmits the enterprise telephone number to the authentication server to authenticate the first user. In comparing the enterprise telephone number to a database of users, the authentication system 114 determines that there is an ambiguity as to who the first user is (e.g., at this point the first user could be any of the multiple users sharing the telephone number). The authentication server 104 returns to the user device an authentication prompt requesting a second authentication credential.

In some instances, the authentication prompt is a user interface (e.g., a popup window) requesting a unique identifier. The authentication prompt may include a specific prompt, such as specifically requesting a unique email address or telephone number distinct from the enterprise telephone number.

Upon receiving the authentication prompt, the user device returns a second authentication credential, such as a personal or work email address. The verification system 112 transmits a verification token (e.g., a one-time password ("OTP")) to the second authentication credential. The user device receives the OTP at the second authentication credential (e.g., the work email address). The user device then returns the OTP to the verification system 112. Responsive to receiving the OTP from the user device, the authentication server 104 generates a cookie or other API key (also referred to herein as an "authentication data structure"). The generated cookie may include authentication data linking the user device to the first user since the work email address is unique to the first user. As such, there is no ambiguity as to which user is in possession of the user device 102. In this way, the verification system 112 verifies the first user using the user device 102 has access to the second authentication credential, and is, therefore, authenticated as being the first user.

Upon verifying the identity of the first user, the authentication system 114 generates an authentication data structure, such as a browser cookie. This browser cookie may be transmitted to the user device 102 to be stored locally and included in future requests or API calls to the enterprise server 106*a*. In some embodiments, the authentication data structure is stored as a data structure on a standalone authentication server (e.g., the authentication server 104) which can be accessed by the enterprise servers 106*a*-106*c*. In some embodiments, the authentication server 104 is a standalone authentication server that is disassociated from the enterprise servers **106*a*-106*c***, being product agnostic and configured to provide authentication of the user device to any communicably coupled enterprise server or computing environment.

Subsequently, the user device 102 may make a request to the enterprise server **106*a* to access a data object using the common authentication credential as an identifier. For example, the first user (an enterprise employee) may access the enterprise server 106*a* on the user device 102**. The first user may input the shared enterprise telephone number into an account identifier text input. In some embodiments, the first user also includes a common password that is shared among the multiple users who share the enterprise telephone number. However, in some embodiments, the first user does not include a password (common or otherwise).

The enterprise server **106*a* may communicate with the client server 108 through the API 120 to call the authentication server 104 to request authentication of the user device 102. Because the enterprise server 106*a* has not authenticated the user device 102 and cannot authenticate the user device 102 because of the ambiguity between the first user and all other users who share the enterprise telephone number, the enterprise server 106*a* requests a standalone or third-party authentication of the user device 102. The enterprise server 106*a* passes the common enterprise telephone number and an identifier of the user device 102 (e.g., an IP address) to the client server 108. The authentication server 104 compares the identifier of the user device 102 to the stored cookies (either stored in the authentication server 104 or the user device 102). The authentication server 104 may determine that the user device 102 which is requesting access to data from the enterprise server 106*a*** is associated with the first user because of the previously generated cookie (if still active) that associated the user device to the first user based on the received and verified OTP from the user device.

In response to determining that the user device 102 is associated with the first user, the authentication server 104 returns the cookie or other indication of authentication to the enterprise server **106*a*. Upon receiving the indication of authentication, the enterprise server 106*a* determines which data or endpoints are accessible to the first user based on a permissions or accessibility list file (e.g., a permissions.yaml file), either in the authentication server 104 and/or the enterprise server 106*a*. The enterprise server 106*a* then grants access to the user device 102 based on the determined endpoint permissions and the user device 102 is then permitted access to the permitted data stored, for example, in the database 118*a***.

In like manner, the first user can then request access to a second computing environment, such as the enterprise server **106*b*. The enterprise server 106*b* may be completely separate from the enterprise server 106*a*, such as a distinct merchant platform. The first user may again input the common enterprise telephone number (or, for example, the unique work email address). In the event that the input identifier (either the common enterprise telephone number or the unique work email address) is associated with a user account in the second computing environment, the enterprise server 106*b* may request (from the authentication server 104 through the client server 108) authentication of the user device 102 based on the inputted identifier. Upon receiving, from the authentication server 104, the authentication of the identifier, the enterprise server 106*b* may grant access to a subset of a set of protected data, the subset of the set of protected data associated with the first user and determined to be authorized to be accessed by the first user based on one or more permission files, similar to the permission process described in relation to the enterprise server 106*a*. Data flow between the disparate components of FIG. 1 is illustrated in FIG. 2**, further detailing the authentication methods described herein.

Figure 2:
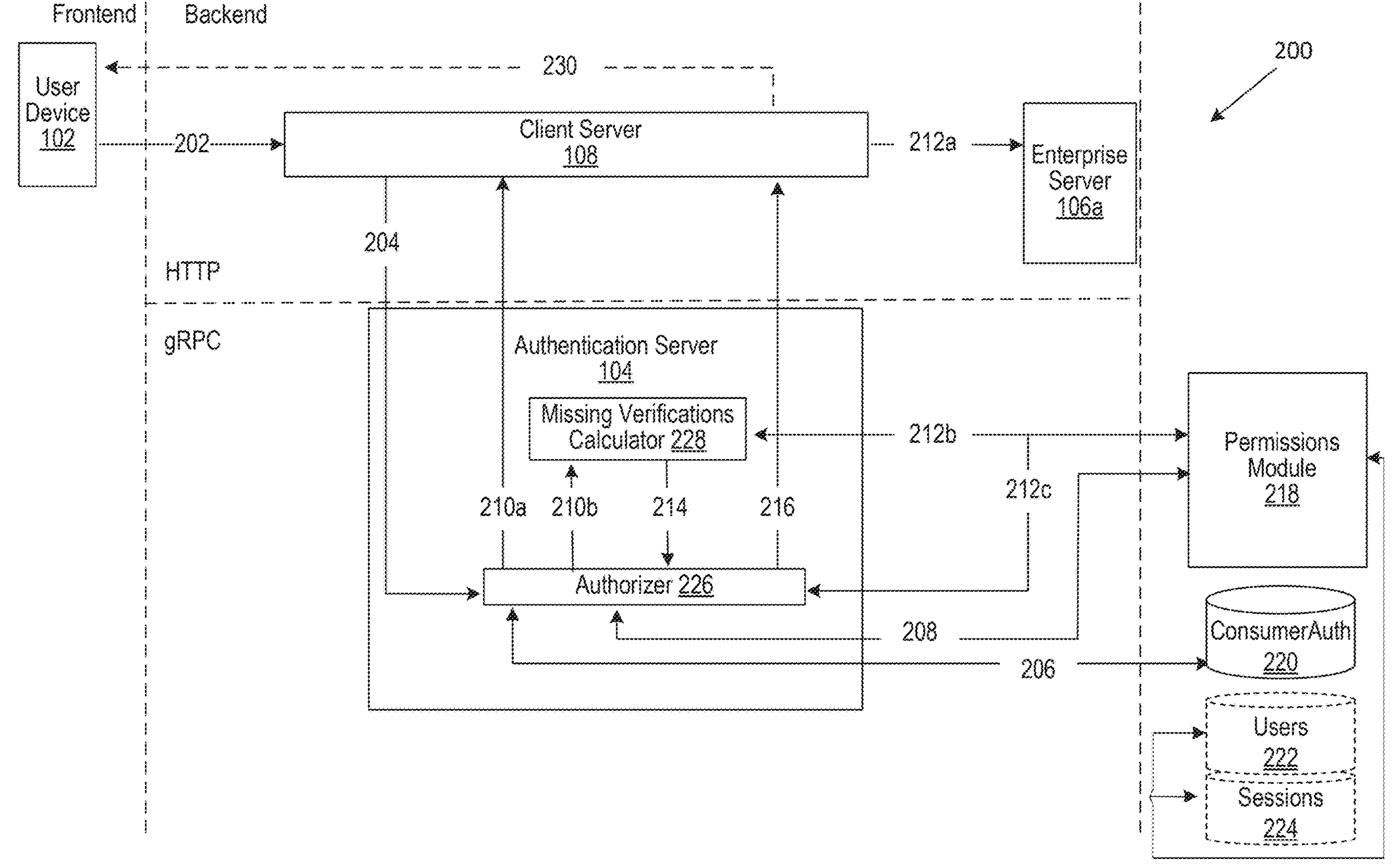
FIG. 2 illustrates a block diagram of data flow within a computing system for authenticating users to access data across multiple computing environments using a single authentication token, according to one or more embodiments.
Figure 3:
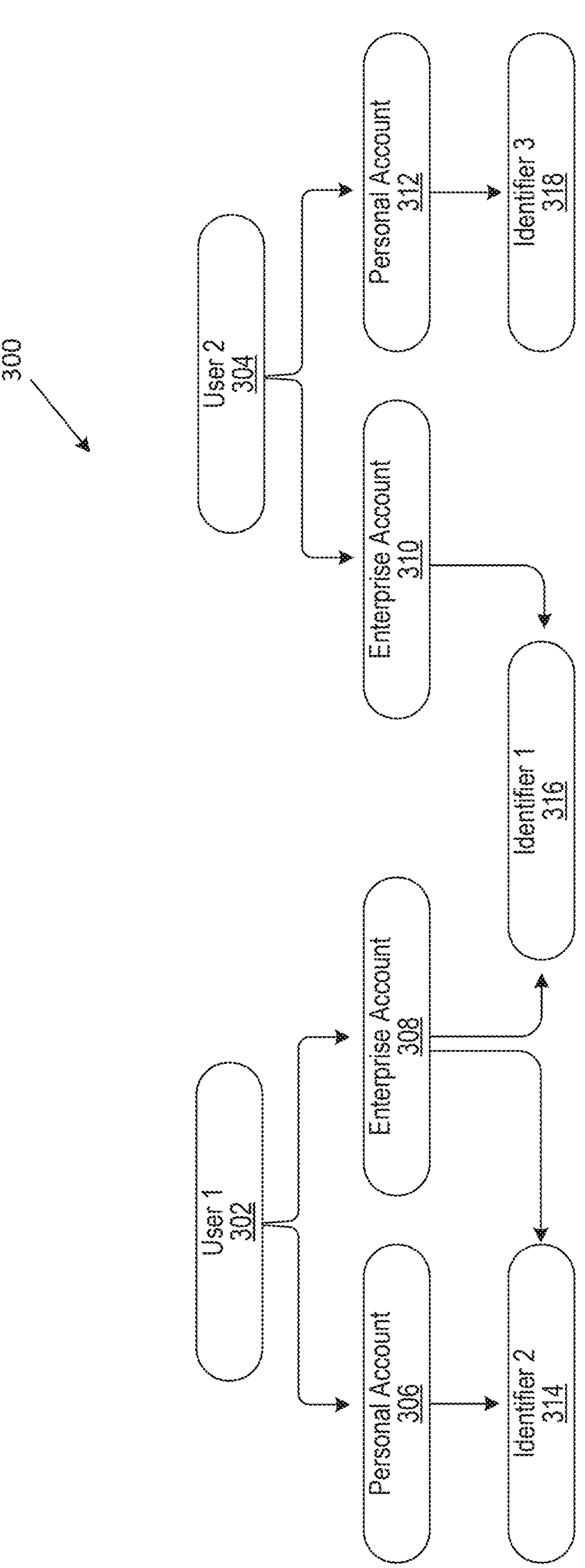
FIG. 3 illustrates a block diagram of an authentication paradigm comprising two unique users sharing a common identifier, according to one or more embodiments.

Turning now to FIG. 2, a block diagram of a non-limiting implementation of a system 200 is shown for authenticating a user based on a user identifier in which the user identifier and/or corresponding password are shared among a plurality of users (as shown in FIG. 3). In some embodiments, the system 200 may be executed on one or more components of the system 100.

A first user associated with the user device 102 transmits a request to access protected data in an enterprise server **106*a* through the client server 108 from a frontend interface (e.g., a client application) at step 202. The request may include a client secret (e.g., the common authentication credential), and the request is transmitted to the client server 108 in the backend of the system 200** through an API gateway.

The users and user accounts may be linked to one or more authentication credentials. For example, the first user requesting access to the protected data in the enterprise server **106*a* through the user device 102 may have a user account (e.g., a data object) with the enterprise server 106*a*. Associated with that data object may be two authentication credentials: a common authentication credential shared with a second user and a second authentication credential unique to the first user with a corresponding encrypted credential (e.g., a password) unique to the second authentication credential. A non-limiting embodiment is illustrated in FIG. 3**.

Turning to FIG. 3, an authentication paradigm 300 is illustrated. The authentication paradigm 300 provides an illustration of an exemplary situation in which a first user 302 and a second user 304 share a common identifier 316. The authentication system shown and described in FIGS. 1-2 provides a method for determining to which account of FIG. 3 (e.g., either enterprise account 308 or 310) to grant access when a user of FIG. 3 attempts to authenticate themselves with the common identifier 316. One or both of the first user 302 and the second user 304 may have a unique identifier in addition to the common identifier 316, for example, a second identifier 314 associated with the first user 302, and a third identifier 318 associated with the second user 304.

As shown in FIG. 3, each of the first user 302 and the second user 304 may have one or more accounts uniquely associated with each user. For example, the first user 302 may have a personal account 306 which is identified by a second identifier 314 (e.g., a personal email address). The first user 302 may also have an enterprise account 308 which may be identified by the common identifier 316 (e.g., a shared enterprise telephone number). In some embodiments, the enterprise account 308 may also be associated with the second identifier 314, however, in some embodiments, the enterprise account 308 is not associated with the second identifier 314. Likewise, the second user 304 is shown as being associated (e.g., owning) two accounts: a personal account 312 (identified by a third identifier 318, such as a personal email address) and an enterprise account 310 (identified by the common identifier 316, such as the shared enterprise telephone number). Both of the enterprise accounts 308 and 310 may be hosted by the same enterprise server, but may be unique to the respective user. For example, the enterprise account 308 may provide access to the first user 302 (but not the second user 302) to access protected personal data associated with the first user 302. Likewise, the enterprise account 310 may provide access to the second user 304 (but not the first user 302) to access protected personal data associated with the second user 304.

As shown by the block diagram in FIG. 3, ambiguity arises when requesting access to an enterprise account when using solely the common identifier 316 (which may or may not also include a common corresponding encrypted credential, such as a password). For example, if the first user 302 inputs into the user device 102 (as shown in FIG. 2) the common identifier 316, the enterprise server 106*a* (as shown in FIG. 2) cannot distinguish between the first user 302 and the second user 304. To ensure proper access to accounts, the enterprise server 106*a* cannot provide access to either enterprise account 308 or the enterprise account 310 because it cannot determine whether the first user 302 is requesting access or the second user 304 is requesting access. Rather, the enterprise server 106*a* needs to disambiguate between the two users to determine which user is requesting access to a data object (e.g., the enterprise account).

Figure 4:
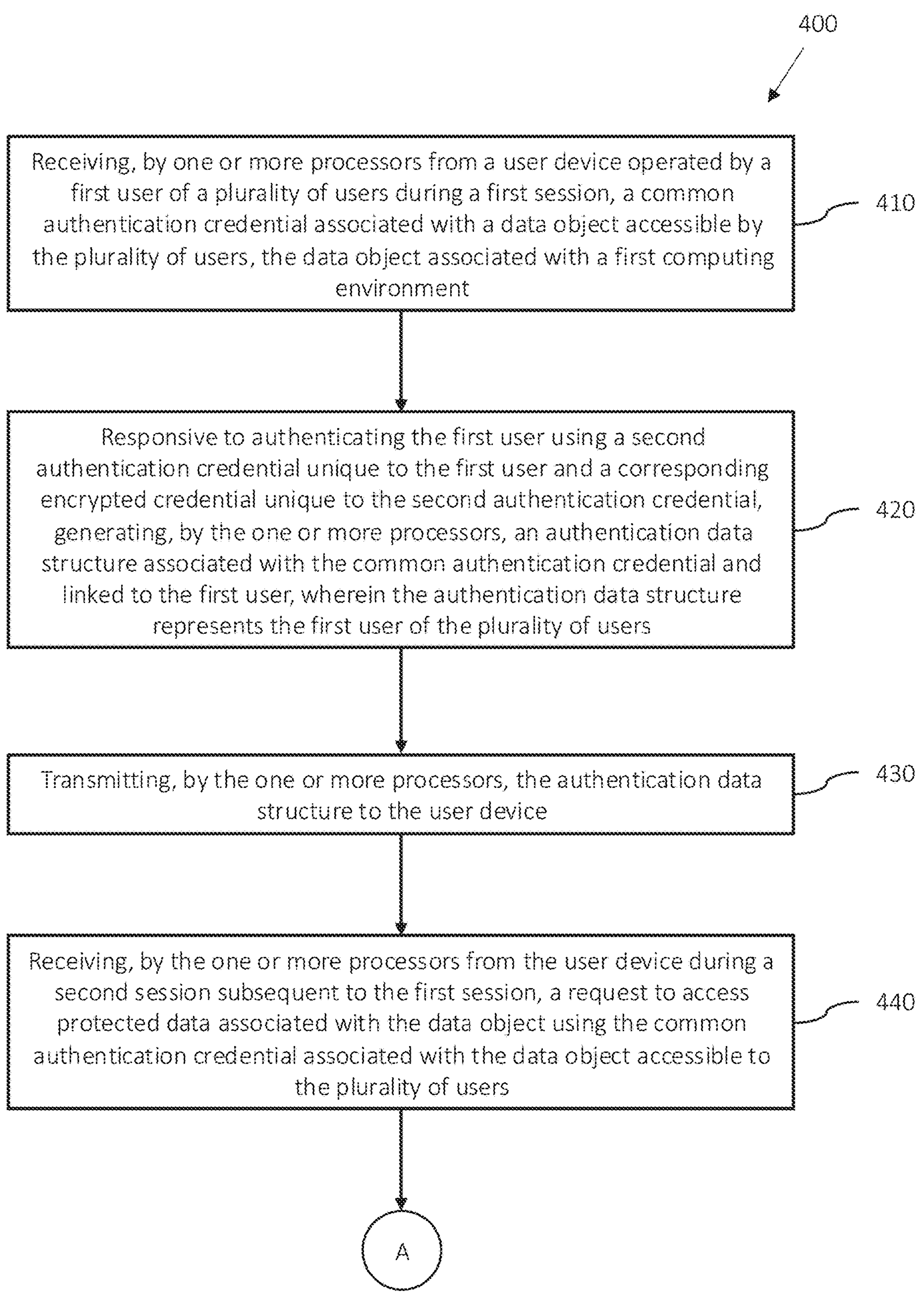
FIG. 4 illustrates a method for authenticating a user in an identifier-centric authentication paradigm, according to one or more embodiments.
Figure 4:
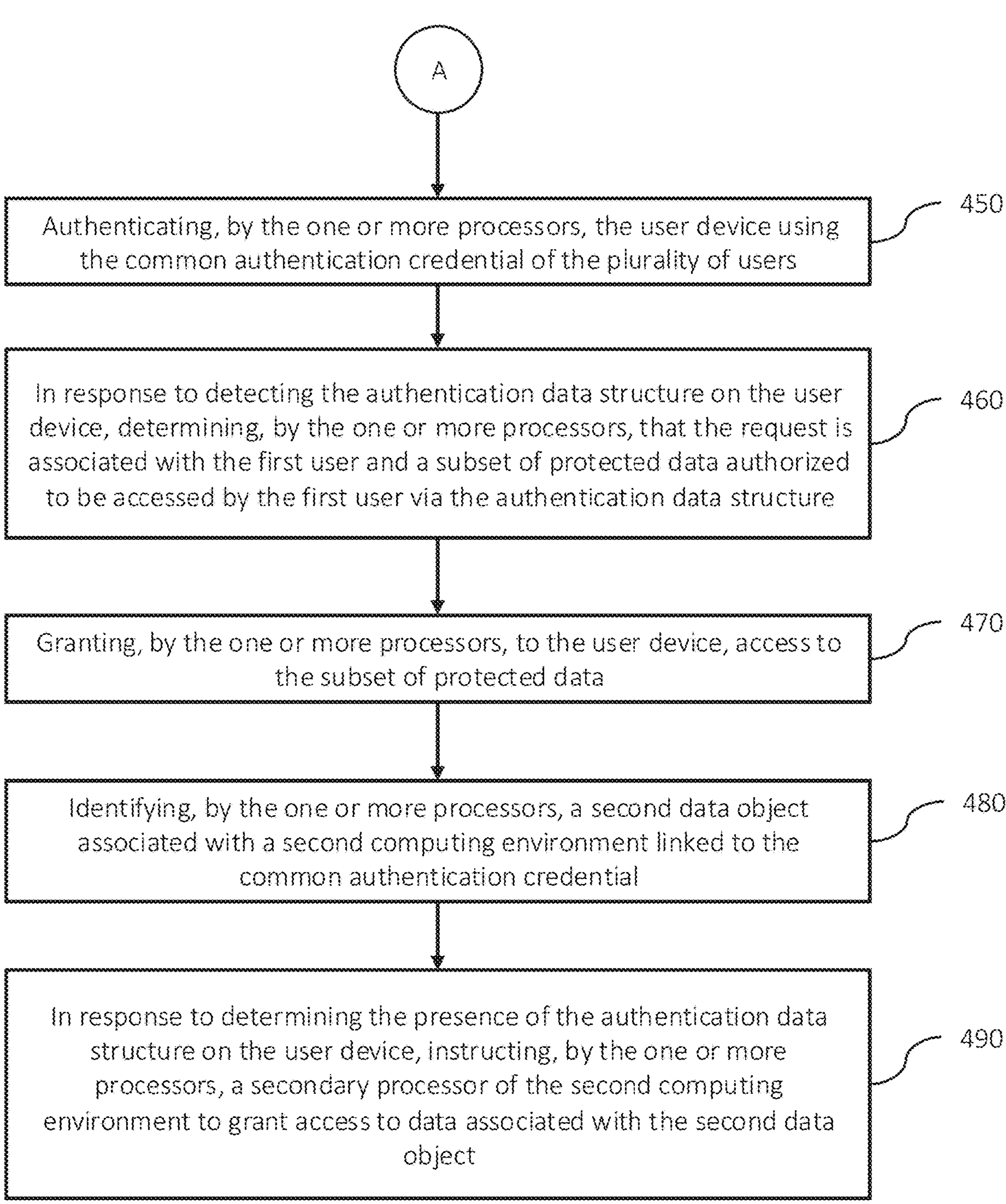

This disambiguation process is shown in at least one embodiment in FIG. 2, and described in detail in the description related to FIG. 4 herein. Referring back to FIG. 2, if the request from the user device 102 does not include an authentication data structure (e.g., a cookie) that authenticates the identity of the first user, then the request is routed at step 204 to the authorizer 226. Upon the authorizer 226 receiving the request, the authorizer 226 retrieves, at step 206, valid (e.g., on-session or off-session) verification sessions previously executed based on the common authentication credential from the ConsumerAuth database 220. If no valid verification sessions are stored or retrievable from the ConsumerAuth database 220, then the authorizer 226 continues at step 208 to retrieve a list of valid endpoint permissions from the permissions module 218. These endpoint permissions may define the data that the user is permitted to access based on the authentication of the user. At step 210*a*, the authorizer 226 then transmits the data indicating what permissions the user device 102 has (e.g., what data is accessible to the first user) based on the common authentication credential passed to the client server 108 or enterprise server 106*a*.

The client server 108 then transmits the received access permissions to the enterprise server 106*a* at step 212*a*, the enterprise server 106*a* then provides access to the user device 102. In at least one embodiment, when the user can be verified as owning the common authentication credential (based on a previously generated verification process) but cannot be disambiguated based on a second authentication credential (e.g., the unique work email address), the permissions module 218 may return permissions to access one or more protected enterprise data. The protected enterprise data may be accessed by all employees of an enterprise (such as authenticated by access to the common authentication credential, such as a common enterprise telephone number).

The protected enterprise data may include enterprise information generic to the enterprise. For example, these may include, organizational policies and procedures, such as the employee handbook, code of conduct, and safety guidelines; strategic documents like the company's mission statement, vision, and core values; operational details, such as organizational charts, department roles, and contact information; enterprise updates, including company news, event announcements, and progress reports on key projects; shared performance metrics and goals, such as quarterly business reports and annual objectives; training materials, professional development resources, and information about available benefits and services; and/or collaborative tools and resources, such as templates, best practices, and knowledge bases, facilitate efficient and standardized work processes across the organization.

In the instance that the permissions module 218 returns no permissions (or possible permissions pending further verification), the authorizer 226 follows step 210*b* to determine, by the missing verifications calculator 228, what verifications are needed to gain additional access permission by comparing the verification and/or authentication data passed to the missing verifications calculator 228 from the user device and/or the authorizer. In some embodiments, the missing verifications calculator 228 requests, from the permissions module 218, possible verification options given the endpoint permission being requested by the user device 102. For example, if the user device 102 is authenticated as being associated with an enterprise employee but not disambiguated, the missing verifications calculator 228 may request what additional verifications (or user data) are possible or needed to disambiguate the user device 102 to authorize further access to protected data. In the example shown in FIG. 3, if the first user 302 provides the common identifier 316 as an identifier, the permissions module 218 may return as an authentication prompt for the user device to return a second identifier (e.g., an email address identifier). This possible authentication prompt may be returned to the missing verifications calculator 228 which may pass the authentication prompt to the authorizer 226 at step 214. The authorizer 226 then relays the authentication prompt to the client server 108 at step 216, which then transmits the authentication prompt for display to the user device 102 at step 230. The permissions module 218 returns relevant permissions to the missing verifications calculator 228 at step 212*b* and/or to the authorizer 226 at step 212*c*.

Upon receiving the authentication prompt to enter a second authentication credential, the user device 102 may receive the second authentication credential (e.g., the second identifier 314 of FIG. 3) from the user. The second authentication credential is transmitted to the authentication server 104. The authentication server 104 may then generate a verification token (e.g., a one-time password ("OTP")) and pass it to the second authentication credential. In the same session, the user device 102 may return the verification token to the authentication server 104. Upon the authentication server 104 receiving from the user device 102 the verification token it had previously transmitted to the second authentication credential, the user device 102 is authenticated as being associated with the first user, and the permissions module 218 transmits updated, available permissions of the user device 102 to the authentication server 104, which then transmits the available permissions to the enterprise server 106*a*.

In some embodiments, the authentication server 104 generates an authentication data structure (e.g., a cookie) and transmits the authentication data structure to the user device 102 to store locally on the user device 102. Additionally or alternatively, the authentication data structure is stored in the one or more of the databases 220, 222, and 224. In subsequent requests to access a data object at enterprise server 106*a* (or other server communicably coupled to the authentication server 104), the user device 102 may pass the authentication data structure with the request to authenticate the user. This may be particularly useful if the request includes only the common authentication identifier. In this way, the user device can be authenticated as being associated with the first user while only providing a common authentication identifier.

The request is then routed to the permissions module 218, which may include, among other files, a permission.yaml file for configuring access to the enterprise server 106*a*. The permission.yaml file may be a configuration file used to define and manage access control for various roles and users, such as the first user 302 and the second user 304 of FIG. 3. It can offer a human-readable format for specifying permissions. The permissions module 218 may define different roles, such as admin, user, and guest, each with a specific set of permissions. These permissions detail the actions or resources the roles can access, such as read, write, update, delete, or specific functionalities like viewing a dashboard or managing user accounts.

YAML, as used herein, may refer to a format that enables groupings of permissions to be structured in a hierarchical structure, which provides an easier way to manage and organize permissions. It includes mappings of user roles, indicating which users belong to which roles, thus aiding in efficient permission management. For example, an admin role might include permissions to manage users, view reports, and edit settings, while a user role might only include viewing reports and submitting feedback. This configuration allows administrators to update permissions, add new roles, or reassign users without modifying the application's core code. This is important because the configurations enable administrators to keep track of the permissions and any changes to them in a way that is clear and aligns with the organization structure.

When the request from the user device 102 includes the authentication data structure, the permissions module 218 may configure access of the user device 102 to the enterprise server 106*a* such that user device 102 is granted permission to view user-protected data associated with the first user.

The one or more processors may also receive, from the user device 102, a common token (e.g., a password) corresponding to the common authentication credential. As with the common authentication credential, the token may be common among the plurality of users. In some embodiments, the authentication credential, in combination with the common token, may be used to access a data object.

In at least one embodiment, the system 200 may include a remote procedure call platform (e.g., gRPC Remote Procedure Call), as illustrated in FIG. 2. The remote procedure call platform may operate independently and serve as the authentication backbone for the system 200 and/or various other services across varied computing infrastructures or environments. The authentication methods described herein as being executed on the remote procedure call platform may handle user authentication requests, verify credentials, and ensure secure access to the platform's resources. In some embodiments, the authentication server 104 and/or the missing verifications calculator 228 may be hosted on the remote procedure call platform, which may allow for cross-platform communication and/or authentication. This may be advantageous in some embodiments by allowing authentication in one platform to be used by another platform, such as the enterprise server 106*a*.

In this architecture, user data may be managed by a standalone database that is sharded by locality. Sharding by locality may include dividing the database into smaller, more manageable pieces based on geographical regions. This approach may improve the performance and scalability of the database by faster and more efficient data access. Localized sharding helps in reducing latency, as user data is stored closer to where it is most frequently accessed. Additionally, it enhances data management practices, making it easier to handle large volumes of data and ensuring that the system can scale horizontally to accommodate more users and higher loads.

Permissions within the system may be specified in a configuration file, such as a permissions.yaml file and stored (or otherwise hosted) in the permissions module 218. The configuration file may serve as a central repository for defining user permissions, allowing consistent and scalable management. The permissions module 218 may be managed at the enterprise level on the enterprise network. New permissions are created to represent combinations of various user authentication factors, such as two-factor authentication or biometric verification. These permissions are then inferred by the endpoint permissions, meaning that the system determines access rights based on the specified combinations of authentication factors. By using a permissions file (e.g., a YAML file) for permission definitions, the system allows for a flexible and human-readable way to manage and update permissions, ensuring that they can be easily modified to meet evolving security requirements.

Product- and data-agnostic, the authentication server 104 is able to authenticate users based on identifier access (e.g., verifying through a one-time password that a user has access to a phone number identifier), and then pass the authenticated credentials to various computing environments as authentication of the user.

The description of FIG. 4 provides a detailed explanation of a method for authenticating between multiple users using common credentials, such as shown FIG. 3. More specifically, FIG. 4 is a flowchart of an example method 400 (e.g., an authentication method) for authenticating a user to access data of a data object (e.g., a user account) hosted by an enterprise server in a computing environment, according to at least one embodiment of the methods and systems described herein. The method 400 may include steps 410, 420, 430, 440, 450, 460, 470, 480, and/or 490. In some embodiments, the method 400 may include more or less steps than those illustrated in FIG. 4. In some embodiments, the method 400 may include one or more alternative steps not illustrated in FIG. 4.

The steps 410-480 of method 400 may be partially or wholly executed by one or more electronic devices (e.g., servers, user devices, processing circuitry, etc.), such as those shown in FIGS. 1-2. In at least one exemplary embodiment, the method 400 may be used to disambiguate and/or authenticate a user device to access unique data associated with the user device in response to a request, by the user device, to access the unique data.

In a non-limiting implementation of the authentication method and system described herein, several users associated with a common data object within the computing environment share a common identifier. For example, several customer service agents (referred to herein as "users") of an enterprise may share a common identifier (e.g., a common telephone number) that is used to access a customer service account within the computing environment (e.g., the enterprise's computing network). In some embodiments, the account is shared among one or more users, each user having a unique profile with data individualized to the respective user. In some embodiments, one or more users have unique accounts.

At least one user ("a first user") may be associated with a unique identifier, such as a personal or work email address. The first user may also have a unique user device that is communicably coupled to the computing environment and used to transmit data to the computing environment (e.g., enterprise server 106*a* of FIG. 1) and receive data from the computing environment. The user device may also be communicably coupled to an authentication server (e.g., the authentication server 104 of FIG. 1), which can be used to authenticate the user device during one or more browser sessions within the computing environment. As used herein, authenticating the user device may alternatively or additionally refer to authenticating the first user.

While each of the plurality of users shares the common identifier to access data (e.g., a data object) on the computing environment, one or more users may have access to data within the data object that is not accessible to each of the plurality of users. Thus, at least in one embodiment of the methods and systems described herein, accessing the computing environment through the user device based on the common identifier results in unique data being presented to the user device based on the user associated with the user device, despite the use of the common identifier.

At step 410 of the method 400, one or more processors of an authentication server receive, from a user device operated by the first user of the plurality of users during a first session, a common authentication credential associated with a data object accessible to the plurality of users, the data object associated with a first computing environment.

As described herein, the user device may be the user device 102 of FIG. 1. The user device may be one or more of a smartphone, tablet, laptop, desktop computer, smartwatch, E-reader, gaming consoles, smart TV, smart home device, virtual reality headset, and/or fitness tracker. The user may input, through a user interface, a common authentication credential to the user device, the user device being associated with the user. The common authentication credential may be the common identifier shared between the plurality of users, such as the shared user customer service telephone number. The one or more processors may also receive, from the user device, a common token (e.g., a password) corresponding to the common authentication credential. As with the common authentication credential, the token may be common among the plurality of users. In some embodiments, the authentication credential, in combination with the common token, may be used to access the data object.

The data object may represent, in some embodiments, a user account identified by and/or associated with the common authentication credential. For example, the data object may be a common customer service account hosted on the computing environment. The data object may include one or more data elements, such as account details, account data, transaction data, personnel data, support ticket data, performance metrics, etc. The data object may be shared with and/or accessible to at least a portion of the plurality of users. However, one or more data restrictions may be used to restrict access of the first user to one or more data elements of the data object. Likewise, one or more data elements may be protected such that only the first user may access it. In this way, the first user may be restricted to viewing, editing, and/or managing data associated with a second user. For example, when accessing the data object, the first user may only have access to the first user's performance metrics, and not access to a second user's performance metrics, though both performance metrics may be stored within the data object.

After receiving, by the one or more processors, the common authentication credential, the one or more processors may receive a common corresponding encrypted credential associated with the authentication server. The one or more processors of the authentication server may authenticate the first user as one of the plurality of users by comparing the common authentication credential and the common corresponding encrypted credential to a validation data stored in the computing environment. The validation data may include the common authentication credential and/or the common corresponding encrypted credential. Upon determining that the received credentials from the user device match the stored validation data, the authentication server generally authenticates the user as one of the plurality of users, but not uniquely/specifically as the first user, as the received credentials are common to the plurality of users.

Upon general authentication of the first user as one of the plurality of users, the authentication server may pass a preliminary token to the computing environment to communicate to the computing environment that the user device is associated with one of the plurality of users. Upon receiving this preliminary token, the computing environment provides the user device access to one or more data elements of the data object. The one or more data elements provided to the user device may correspond to shared data among the plurality of users. The one or more shared data elements may include enterprise information generic to the enterprise. For example, these may include, organizational policies and procedures, such as the employee handbook, code of conduct, and safety guidelines; strategic documents like the company's mission statement, vision, and core values; operational details, such as organizational charts, department roles, and contact information; enterprise updates, including company news, event announcements, and progress reports on key projects; shared performance metrics and goals, such as quarterly business reports and annual objectives; training materials, professional development resources, and information about available benefits and services; and/or collaborative tools and resources, such as templates, best practices, and knowledge bases, facilitate efficient and standardized work processes across the organization.

In some embodiments, the authentication server may transmit an authentication prompt (or otherwise provide an opportunity to input) a second authentication credential and a corresponding encrypted credential unique to the second authentication credential.

The second authentication credential may be a unique identifier that is not shared with other users (including, for example, the second user). This second authentication credential may be used by the one or more processors to disambiguate/determine the user attempting to access the data object from among all of the plurality of users associated with the common authentication credential. Because the common authentication credential is common to the plurality of users, the authentication server may be unable to determine with certainty (without more information) which user input the common authentication credential. However, because the second authentication credential is unique to an individual user (e.g., the first user), the authentication server is able to determine which user is attempting to access the data object. For example, the authentication server may cross-reference the second authentication credential with a database of authentication credentials to determine a unique user associated with the second authentication credential.

At step 420, responsive to authenticating the first user using the second authentication credential unique to the first user and the corresponding encrypted credential unique to the second authentication credential, the one or more processors of the authentication server generate an authentication data structure associated with the common authentication credential and linked to the first user, wherein the authentication data structure represents a particular user of the plurality of users.

Upon authenticating the first user based, at least in part, on the second authentication credential and the corresponding encrypted credential, the one or more processors of the authorization server generate an authentication data structure. The authentication data structure may be, in some embodiments, a token such as a digital certificate, an OAuth token, a JWT token, a session token, an API key, a SAML token, an ID token, a persistent cookie, a refresh token, an SSO token, etc.

The generated authentication data structure may be associated with the first user, such that passing the authentication data structure to a computing server provides authentication that the user device from which the authentication data structure came is associated with the first user. Additionally or alternatively, the generated authentication data structure may be associated with the user device from which the authorization server received the common authentication credential and/or the second authentication credential.

At step 430, the one or more processors transmit the authentication data structure to the user device. The authentication data structure generated by the authentication server is transmitted to the user device associated with the first user. For example, the authentication data structures may be transmitted to a local device (e.g., the user device) through secure communication channels on a network. The authentication data structure may include, among other elements, information such as the first user's (or user device's) identity, permissions, and expiration time of the authentication data. In some embodiments, the authentication data structure has an expiration limit, in which the authentication data structure expires (e.g., no longer authenticates the user) after a defined number of authentications and/or a defined period of time.

The authentication server transmits the authentication data structure to the user's local user device over the network, for example, using HTTPS, which encrypts the data during transmission to protect it from interception or tampering. Once received, the local device securely stores the authentication data structure. Storage methods may include HTTP-only and secure cookies, which restrict access to the cookie data to one or more servers and ensure it is transmitted only over secure connections, or local storage options like the browser's local storage or session storage.

The local user device may include the authentication data structure in subsequent requests to the enterprise server, typically by attaching it to HTTP headers, such as a Bearer token, in the Authorization header or including it in the body of API requests. In some embodiments, when the enterprise server receives a request with the authentication data structure, it validates the structure to ensure it remains valid and has the appropriate permissions for the requested resource or action.

Upon receiving the authorization data structure, the user device may make a request to the enterprise server to access restricted data which is associated with the user/user device. Included in the request may be the authorization data structure, which is used by the enterprise server to authenticate the user/user device as having permission to access the restricted/protected data. Upon validation of the authorization data structure, the request is granted and the user device is permitted access to the restricted data.

At step 440, the one or more processors receive from the user device during a second session subsequent to the first session, a request to access protected data associated with the data object using the common authentication credential associated with the data object accessible to the plurality of users.

In the second session (e.g., browsing session), the user device transmits a second request to access protected data. With the second request, the user device transmits the common authentication credential (and, in some embodiments, the corresponding encrypted credential). In this instance, the user device need not request or receive a unique authentication credential to disambiguate the user device/user from among the plurality of users. Rather, at step 450, the one or more processors may authenticate the user device as being associated with the plurality of users using the common authentication credential of the plurality of users. In some embodiments, the one or more processors disambiguate the request by identifying, by the one or more processors, a presence of the authentication data structure on the user device.

The request for access to the data may include, in some embodiments, the authentication data structure, which the enterprise server validates upon receipt. In some embodiments, the user device transmits the request directly to the enterprise server, and the enterprise server requests authentication from either the user device and/or the authentication server. Upon receipt of the request for authentication, the user device and/or the authentication server transmits the stored authentication data structure to the enterprise server in the computing environment, which then validates the transmitted authentication data structure. Because the authentication data structure includes an indication of the identity of the user/user device, the computing environment is able to disambiguate the user device (and thus the associated user) from among the plurality of users.

At step 460, in response to detecting the authentication data structure on the user device, the one or more processors determine that the request is associated with the first user and a subset of protected data authorized to be accessed by the first user via the authentication data structure. In embodiments in which the system disambiguates the user device, once the user device is disambiguated, the one or more processors search one or more permission instructions to determine which subset of protected data in the data object is associated and/or accessible by the user device/user. The enterprise server may host various protected data, including data elements, that are protected at various levels of restriction (such as requiring authentication of a user). The one or more processors may compare the authorized access of the user device to the levels of restriction to determine a subset of protected data that the user device is authorized to access. This determination may be done by comparing the authorized user account to associated data accessible by the authorized user account. Various data may be accessible to the first user, and so once the user who is requesting access to the data through the user device is authenticated as being the first user, the one or more processors grant to the user device access to the subset of the set of protected data at step 470.

At step 480, the one or more processors identify a second data object (e.g., the enterprise server 106*b* of FIG. 1) associated with a second computing environment and linked to the common authentication credential. In some embodiments, the user may utilize the common authentication credential for multiple data objects, such as the second data object. The second data object may be associated with a second user account in a second computing environment/infrastructure. For example, the common customer service telephone number may be used by the user to access a human resources environment of the enterprise, the human resource environment hosted separately from the customer service accounts. In some embodiments, the authentication server may determine that the common authentication credential may be used to identify a user in the second computing environment. Upon doing so, the authentication server may request the authentication data structure from the user device to further distinguish the user device.

In some embodiments, the user device requests to access the second data object by transmitting the common authentication credential to the second enterprise server and/or the authentication server. The second enterprise server may provide access to the user device of common data shared among the plurality of users. In at least some embodiments, multiple users may provide the common authentication credential to the second enterprise server to access the common data elements.

Upon receiving a request by the user device to access data unique to the first user (e.g., protected/restricted data), the second enterprise server may request from the authentication server and/or the user device the authentication data structure associated with the first user. In response to receiving the request for the authentication data structure, the user device and/or the authentication server transmits the previously stored authentication data structure to the second computing environment.

At step 490, in response to determining the presence of the authentication data structure on the user device, the one or more processors instruct a secondary processor of the second computing environment to grant access to data associated with the second data object. Without requiring a secondary validation of the user, the user device is able to transmit the common authentication credential to the second computing environment which is completely separated to the first computing environment, and gain individualized access to protected data based on the stored authentication data structure from the previous session.

In some embodiments, the data object being requested to access has a heightened security requirement to access. For example, the permission file may include a verification requirement for accessing a specific action associated with the account. This may include, for example, logging in from a new device or location, changing the account password, updating personal information such as email addresses or phone numbers, initiating financial transactions like payments or transfers, accessing sensitive data or high-value services, making significant changes to account settings or permissions, recovering a forgotten password, and adding or modifying security settings like enabling two-factor authentication, deleting the account, etc. These measures help to enhance account security and protect against unauthorized access.

The one or more processors may determine, based on accessing the permissions file, the verification requirements and provide a prompt to the user device of the appropriate (e.g., determined) verification prompts. For example, upon the user attempting to change the password of the account, the one or more processors may determine that a second verification of identity need be executed, and the one or more processors may transmit a second verification code (e.g., a one-time password) to a third authentication credential (e.g., a recovery email). The first user may return the verification code received at the recovery email to the one or more processors. Upon receiving the verification token from the user device, the one or more processors verify the identity of the first user as the user operating the user device and grants access to the data object.

A non-limiting example of the method 400 includes two employees, Jack and Jill, working in the same division of Acme Corporation, which has an internal employee computer network that employees can log into in order to access both personal data (personal contact data, performance metrics, etc.) and business data (business templates, standard operating procedures, etc.). Jack and Jill are both assigned the same work email address and password that they are both able to use to log into the network. To login, Jack inputs his shared work email address and password. The system recognizes this email address and the corresponding password, which authenticates him as an employee. However, the system cannot determine if it was Jack or Jill who input the login credentials. In response to this, the system prompts Jack to input a unique identifier that is not shared with another user (e.g., his personal phone number). Jack inputs his personal phone number at the prompt and he receives a one-time password on his personal number from the system.

Jack can then provide the one-time password to the network to verify that he has access to the phone number. This verifies that he, Jack, is the user attempting to login with the work email address, thus distinguishing him from Jill. His device subsequently receives an authentication cookie that can be used to authenticate his device as being associated with Jack. Once the system verifies that Jack is the user attempting to login, the system personalizes the account for him, including, for example, access to his protected personal data (e.g., contact information, etc.). This authentication cookie may remain on his device such that he may be authenticated when attempting to access the network in future sessions. For example, after signing out of the current session in which he is authenticated, Jack may attempt to sign in again the next day. After inputting the common email address again, the network requests authentication of the user from his device. The stored authentication token is passed to the network and Jack is again authenticated, even though, in this instance, he only inputs a common email address.

Figure 5:
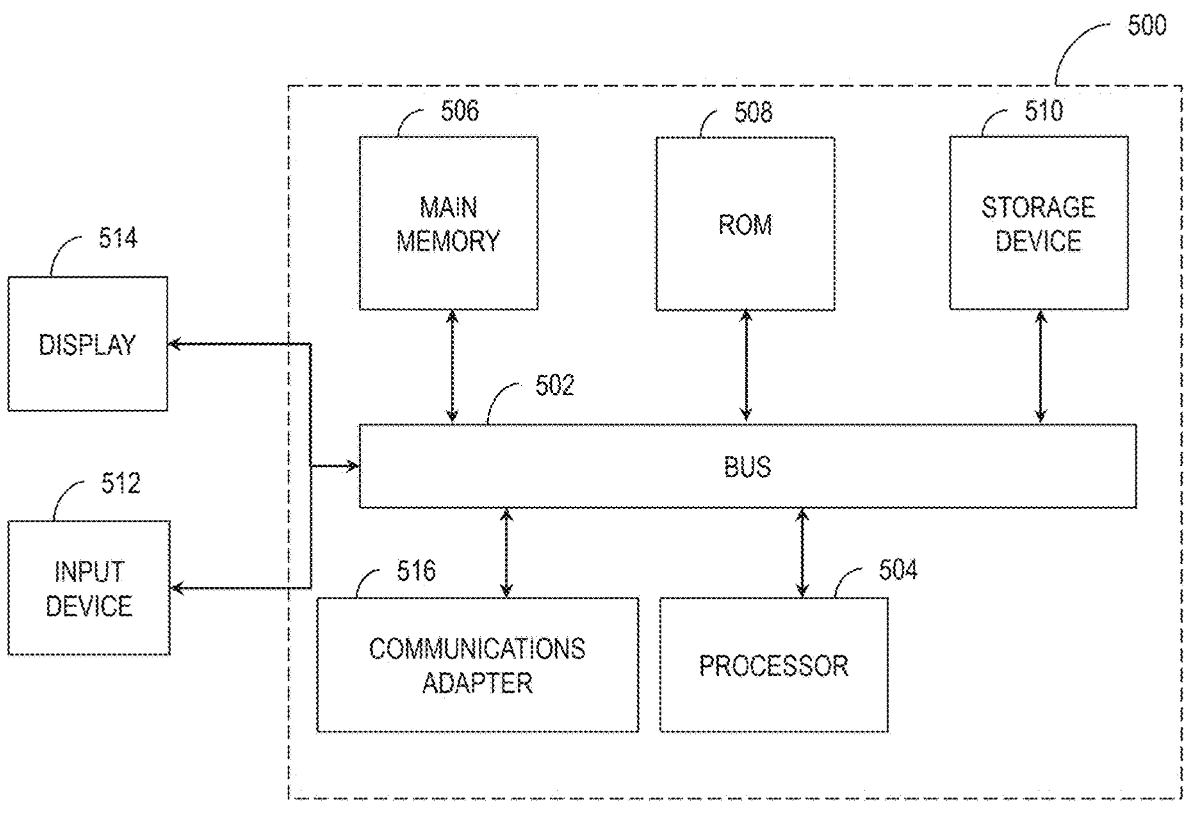
FIG. 5 illustrates a component diagram of a computing system suitable for use in the various implementations described herein, according to one or more embodiments.

FIG. 5 is a component diagram of an example computing system suitable for use in the various implementations described herein, according to an example implementation. One or more steps of the methods and processes discussed herein can be performed by the computing system depicted in FIG. 5. The computing system 500 includes a bus 502 or other communication component for communicating information and a processor 504 coupled to the bus 502 for processing information. The computing system 500 also includes main memory 506, such as a RAM or other dynamic storage device, coupled to the bus 502 for storing information, and instructions to be executed by the processor 504. Main memory 506 can also be used for storing position information, temporary variables, or other intermediate information during the execution of instructions by the processor 504. The computing system 500 may further include a ROM 508 or other static storage device coupled to the bus 502 for storing static information and instructions for the processor 504. A storage device 510, such as a solid-state device, magnetic disk, or optical disk, is coupled to the bus 502 for persistently storing information and instructions.

The computing system 500 may be coupled via the bus 502 to a display 514, such as a liquid crystal display, or active-matrix display, for displaying information to a user. An input device 512, such as a keyboard including alphanumeric and other keys, may be coupled to the bus 502 for communicating information, and command selections to the processor 504. In another implementation, the input device 512 has a touchscreen display. The input device 512 can include any type of biometric sensor, or a cursor control, such as a mouse, a trackball, or cursor direction keys, for communicating direction information and command selections to the processor 504 and for controlling cursor movement on the display 514.

In some implementations, the computing system 500 may include a communications adapter 516, such as a networking adapter. Communications adapter 516 may be coupled to bus 502 and may be configured to enable communications with a computing or communications network or other computing systems. In various illustrative implementations, any type of networking configuration may be achieved using communications adapter 516, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 500 in response to the processor 504 executing an implementation of instructions contained in main memory 506. Such instructions can be read into main memory 506 from another computer-readable medium, such as the storage device 510. Execution of the implementation of instructions contained in main memory 506 causes the computing system 500 to perform the illustrative processes described herein. One or more processors in a multi-processing implementation may also be employed to execute the instructions contained in the main memory 506. In alternative implementations, hard-wired circuitry may be used in place of or in combination with software instructions to implement illustrative implementations. Thus, implementations are not limited to any specific combination of hardware circuitry and software.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means, including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a computer-readable non-transitory medium or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. An authentication method comprising:

receiving, by one or more processors from a user device operated by a first user of a plurality of users during a first session, a common authentication credential associated with a data object accessible by the plurality of users, the data object associated with a first computing environment;

responsive to authenticating the first user using a second authentication credential unique to the first user and a corresponding encrypted credential unique to the second authentication credential, generating, by the one or more processors, an authentication data structure associated with the common authentication credential and linked to the first user, wherein the authentication data structure represents the first user of the plurality of users;

transmitting, by the one or more processors, the authentication data structure to the user device;

receiving, by the one or more processors from the user device during a second session subsequent to the first session, a request to access protected data associated with the data object using the common authentication credential associated with the data object accessible to the plurality of users;

authenticating, by the one or more processors, the user device using the common authentication credential of the plurality of users;

in response to detecting the authentication data structure on the user device, determining, by the one or more processors, that the request is associated with the first user and a subset of protected data authorized to be accessed by the first user via the authentication data structure;

granting, by the one or more processors, to the user device, access to the subset of protected data;

identifying, by the one or more processors, a second data object associated with a second computing environment linked to the common authentication credential; and in response to determining the presence of the authentication data structure on the user device, instructing, by the one or more processors, a secondary processor of the second computing environment to grant access to data associated with the second data object.

2. The authentication method of claim 1, further comprising:

receiving, by the one or more processors from the user device, a selection of the authentication data structure prior to receiving the request, such that the user device is configured to access at least the second data object using a second authentication data structure.

3. The authentication method of claim 1, further comprising:

instructing, by the one or more processors, an application programming interface to transmit the authentication data structure to the one or more processors of a computing environment when the first user requests access to one or more data objects associated with the computing environment.

4. The authentication method of claim 1, further comprising:

receiving, by the one or more processors from a server hosted on the first computing environment through an application programming interface, a request for an authentication of the user device; and transmitting, by the one or more processors to the server, the authentication data structure.

5. The authentication method of claim 1, further comprising:

determining, by the one or more processors, a verification requirement for accessing the data object, wherein the verification requirement includes verifying the common authentication credential and the second authentication credential;

transmitting, by the one or more processors to the common authentication credential accessed on the user device, a verification token; and verifying, by the one or more processors, the common authentication credential in response to receiving the verification token from the user device.

6. The authentication method of claim 1, further comprising disambiguating, by the one or more processors, the request by identifying, by the one or more processors, a presence of the authentication data structure on the user device.

7. A system comprising:

one or more processors; and a computer-readable non-transitory medium comprising instructions that, when executed by the one or more processors, cause the one or more processors to:

receive from a user device operated by a first user of a plurality of users during a first session, a common authentication credential associated with a data object accessible to the plurality of users;

responsive to authenticating the first user using a second authentication credential unique to the first user, generate an authentication token associated with the common authentication credential and linked to the first user, wherein the authentication token represents a particular user of the plurality of users;

transmit the authentication token to the user device;

receive from the user device during a second session subsequent to the first session, a request to access protected data associated with the data object using the common authentication credential associated with the data object accessible to the plurality of users;

authenticate the user device using the common authentication credential of the plurality of users;

determine a subset of the protected data authorized to be accessed by the first user via the authentication token; and grant to the user device, access to the subset of the protected data.

8. The system of claim 7, wherein authenticating the first user is performed without receiving the common authentication credential.

9. The system of claim 7, wherein authenticating the first user comprises:

transmitting an authentication prompt to the user device linked to the common authentication credential and the second authentication credential.

10. The system of claim 7, wherein the authentication token is stored as a data structure on a browser of the user device.

11. The system of claim 7, the instructions further causing the one or more processors to:

receive from a server hosted on a first computing environment through an application programming interface, a request for an authentication of the user device; and transmit to the server, the authentication token.

12. The system of claim 7, the instructions further causing the one or more processors to:

determine a verification requirement for accessing the data object, wherein the verification requirement includes verifying the common authentication credential and the second authentication credential;

transmit to an account identified by the common authentication credential and accessed on the user device, a verification token; and verify the common authentication credential in response to receiving the verification token from the user device.

13. The system of claim 10, the instructions further causing the one or more processors to disambiguate the request by identifying a presence of the authentication token on the user device.

14. An authentication method comprising:

receiving, by one or more processors from a user device operated by a first user of a plurality of users during a first session, a common authentication credential associated with a data object accessible to the plurality of users;

responsive to authenticating the first user using a second authentication credential unique to the first user, generating, by the one or more processors, an authentication token associated with the common authentication credential and linked to the first user, wherein the authentication token represents a particular user of the plurality of users;

transmitting, by the one or more processors, the authentication token to the user device;

receiving, by the one or more processors from the user device during a second session subsequent to the first session, a request to access protected data associated with the data object using the common authentication credential associated with the data object accessible to the plurality of users;

authenticating, by the one or more processors, the user device using the common authentication credential of the plurality of users;

determining, by the one or more processors, a subset of the protected data authorized to be accessed by the first user via the authentication token; and granting, by the one or more processors, to the user device, access to the subset of the protected data.

15. The authentication method of claim 14, wherein authenticating the first user is performed without receiving the common authentication credential.

16. The authentication method of claim 14, wherein authenticating the first user comprises:

transmitting, by the one or more processors, an authentication prompt to the user device linked to the common authentication credential and the second authentication credential.

17. The authentication method of claim 14, wherein the authentication token is stored as a data structure on a standalone authentication server, wherein the standalone authentication server is product agnostic.

18. The authentication method of claim 14, further comprising:

receiving, by the one or more processors from a server hosted on a first computing environment through an application programming interface, a request for an authentication of the user device; and transmitting, by the one or more processors to the server, the authentication token.

19. The authentication method of claim 14, further comprising:

determining, by the one or more processors, a verification requirement for accessing the data object, wherein the verification requirement includes verifying the common authentication credential and the second authentication credential;

transmitting, by the one or more processors to the common authentication credential accessed on the user device, a verification token; and verifying, by the one or more processors, the common authentication credential in response to receiving the verification token from the user device.

20. The authentication method of claim 14, further comprising disambiguating, by the one or more processors, the request by identifying, by the one or more processors, a presence of the authentication token on the user device.

* * * * *